United States Patent [19]

Okabe et al.

[11] 4,396,281
[45] Aug. 2, 1983

[54] NEGATIVE FILM CARRIER DEVICE

[75] Inventors: Katsuhiko Okabe, Tokorozawa; Toshihiko Watanabe, Tokyo, both of Japan

[73] Assignee: Copal Company Limited, Tokyo, Japan

[21] Appl. No.: 342,424

[22] Filed: Jan. 25, 1982

[30] Foreign Application Priority Data

Jan. 26, 1981 [JP] Japan .................................. 56-9939

[51] Int. Cl.³ .......................................... G03B 27/62
[52] U.S. Cl. .................................... 355/75; 355/76
[58] Field of Search .................................. 355/75, 76

[56] References Cited

U.S. PATENT DOCUMENTS

| 2,552,225 | 5/1951 | Simmons et al. | 355/75 |
| 4,161,365 | 7/1979 | Anderson et al. | 355/75 |
| 4,313,677 | 2/1982 | Stewart | 355/76 |
| 4,353,645 | 10/1982 | Kogane et al. | 355/75 |

Primary Examiner—Monroe H. Hayes
Attorney, Agent, or Firm—Cushman, Darby & Cushman

[57] ABSTRACT

A negative film carrier device comprising a negative film carrier provided with an inherent signal part corresponding to the size of a negative film to be carried and a negative film carrier supporting base provided with a negative film size senser switch which can be operated by the signal part when the negative film carrier is mounted, in order to prevent the misoperation in the case of changing the size of the negative film and to facilitate the automation of the printer.

3 Claims, 3 Drawing Figures

NEGATIVE FILM CARRIER DEVICE

BACKGROUND OF THE INVENTION (a) Field of the Invention

This invention relates to negative film carrier devices to be used for photographic printers.

(b) Description of the Prior Art

In a photographic printer, in the case of changing the size of a negative film, the operations of replacing the negative film carrier and such other part as, for example, an enlarging lens will be made. Conventionally, such operations have been made respectively separately. Therefore, there have been disadvantages that, for example, even though the negative film carrier is replaced, it may be forgotten to replace the enlarging lens and that, when an operator changes to another operator in the course of printing working, the succession will not be sufficient and what size of the negative film is set will not be found.

SUMMARY OF THE INVENTION

In view of the above mentioned circumstances, a primary object of the present invention is to provide a negative film carrier device wherein, when a negative film carrier is replaced to change the size of a negative film, a signal inherent to the negative film size to be used can be issued by an electric means as operatively connected with the replacing operation.

Another object of the present invention is to provide a negative film carrier device of the above mentioned type which has a simple structure and can be favorably used for automatic printers.

These and other objects of the present invention will become more apparent during the course of the following detailed description and appended claims.

DESCRIPTION OF THE PREFERRED EMBODIMENT

Figure 1:
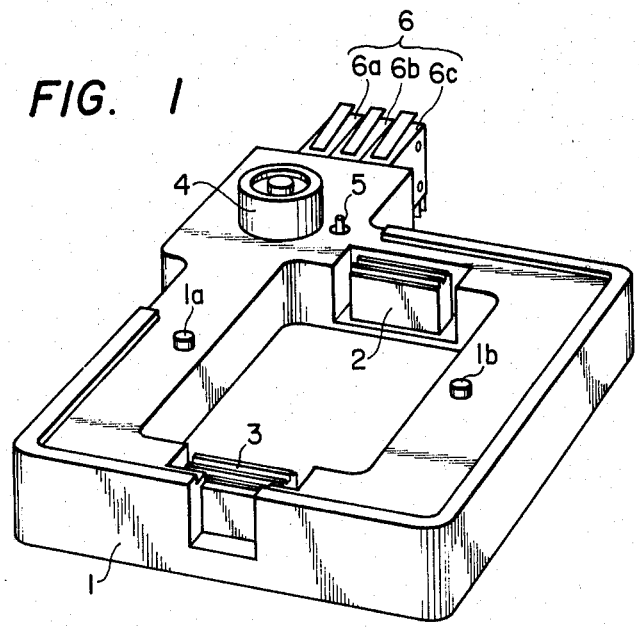
FIG. 1 is a perspective view showing an embodiment of a negative film carrier supporting base part of a negative film carrier device according to the present invention.

In FIG. 1, the reference numeral 1 denotes a negative film carrier supporting base which is a part of a printer body and has guide pins 1a and 1b erected, 2 and 3 denote a pair of magnet catches secured to the negative film carrier supporting base 1, 4 denotes an electromagnet secured to the negative film carrier supporting base 1, 5 denotes a negative film mask releasing pin which can be projected by a driving device not illustrated and 6 denotes a negative film size senser switch consisting of microswitches 6a, 6b and 6c.

Figure 2:
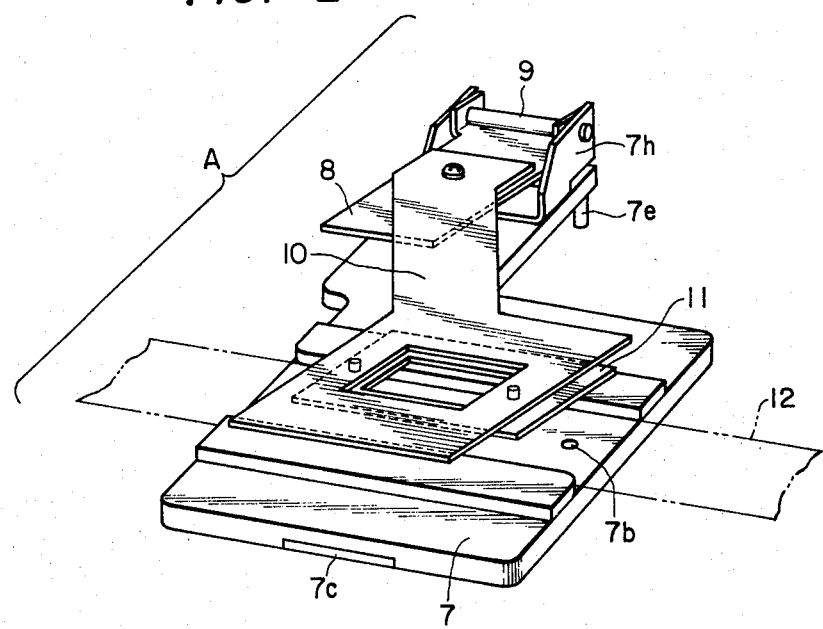
FIG. 2 is a perspective view of an embodiment of a negative film carrier part of a negative film carrier device according to the present invention.

In FIG. 2, the reference numeral 7 denotes a negative film holder plate to be supported on the negative film carrier supporting base 1, 8 denotes an armature plate fitted rockably by a shaft 9 to a bracket 7h provided integrally with the negative film holder plate 7, 10 denotes a negative film mask fitted integrally to this armature plate 8, 11 denotes a negative film presser fitted resiliently and relatively movably by a known method to the negative film mask 10 and 12 denotes a negative film and the symbol A denotes a negative ilm carrier unit made by combining the negative film holder plate 7 and negative film mask 10.

Figure 3:
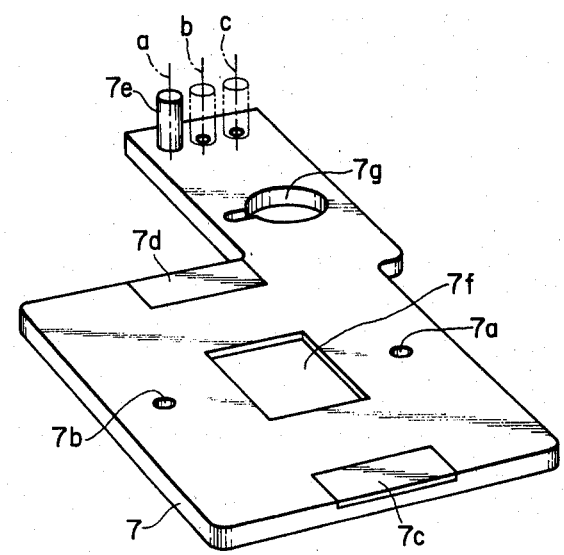
FIG. 3 is a perspective view showing the formation of the bottom surface of the negative film carrier part shown in FIG. 2.

FIG. 3 shows as turned the negative film holder plate 7 shown in FIG. 2. In this negative film holder plate 7, guide holes 7a and 7b which can fit respectively with the guide pins 1a and 1b are formed, a pair of armature pieces 7c and 7d to be attracted respectively to the pair of magnet catches 3 and 2 are secured and a pin 7e serving as a signal member which can operate the negative film size senser switch 6 is erected in any of inherent positions a, b and c in response to the negative film size. The reference numeral 7f denotes an exposure aperture and 7g denotes an escape hole for the electromagnet 4 and negative film mask releasing pin 5.

The operations of attaching and detaching the above mentioned negative film carrier unit A onto and from the negative film carrier supporting base 1 shall be explained in the following.

In attaching the negative film carrier unit A to the negative film carrier supporting base 1, the negative film holder plate 7 is mounted on the negative film carrier supporting base 1 and the guide holes 7a and 7b may be fitted respectively to the guide pins 1a and 1b. Thereby, the armature pieces 7c and 7d will be attracted respectively by the magnet catches 3 and 2 to complate the attaching of the negative film carrier unit A. When the negative film carrier unit A is attached onto the negative film carrier supporting base 1, the signal pin 7e erected in any of the positions a, b and c on the negative film holder plate 7 in response to the negative film size will operate any of the microswitches 6a, 6b and 6c on the negative film carrier supporting base 1 and thereby the negative film size senser switch 6 will issue a signal of what the size of the negative film held by this negative film carrier unit A is.

This signal pin 7e is not limited to be in any one of the positions a, b and c, the positions also are not limited to be three and the number of the positions may be of a value with which combinations corresponding to the kinds of the required signals are obtained. For example, as in the above mentioned embodiment, if there are three positions, 7 kinds of signals will be able to be obtained by using one to three pins 7e. Therefore, in case four to seven kinds of negative film carriers are prepared, they will be able to be respectively distingnished.

On the basis of the thus obtained signal, merely the negative film size may be only indicated or, as automated, such other member to be replaced in the case of changing the negative film size as, for example, an enlarging lens may be replaced.

At the time of printing, the electromagnet 4 will be energized, the armature plate 8 will be thereby attracted, the negative film mask 10 will be pressed toward the negative film holder plate 7, the negative film presser 11 will be pressed onto the negative film holder plate 7 and the negative film 12 will be fixed between them.

In the case of replacing the negative film 12, the electromagnet 4 will be de-energized, the armature plate 8 will be released, the negative film mask releasing pin 5 will be projected to push up the armature plate 8 and the negative film presser 11 will be thereby lifted. To thus drive the negative film mask releasing pin 5, such electromagnetic means as a plunger or any other mechanical means may be used.

In order to detach the negative film carrier unit A from the negative film carrier supporting base 1, the armature pieces 7c and 7d may be separated respectively from the magnet catches 3 and 2 so that thereby both may be disconnected from each other and a new negative film carrier unit may be set.

By the way, in the above mentioned embodiment, it is shown that, in order to operate the negative film size senser switch 6, the signal pin 7e is erected on the negative film holder plate 7 so as to be operated as engaged in contact with the switch 6. However, besides such method that the projection is formed on the negative film holder plate 7, for example, even if the negative film holder plate 7 itself is engaged in contact with the negative film size senser switch 6 and the negative film holder plate 7 is provided with a recess or the like so that the negative film holder plate 7 may not be engaged in contact with any other switch than is required in response to the negative film size or the like, the same effect will be obtained in the operation. In short, such recess and projections as will be able to give the negative film size senser switch a signal required for the negative film size or the like when the negative film holder plate 7 is fitted may be formed on the negative film holder plate 7.

We claim:

1. A negative film carrier device comprising a negative film holder plate capable of holding a negative film and having an inherent signal part corresponding to the size of the negative film or the like, a negative film mask supported movably with respect to said negative film holder plate and having a negative film presser capable of pressing said negative film onto said negative film holder plate to form a negative film carrier unit, a negative film carrier supporting base capable of supporting said negative film holder plate and having a negative film size senser switch engageable with said signal part when said negative film holder plate is mounted on said negative film carrier supporting base, and a connecting means fixing said negative film holder plate on said negative film carrier supporting base when said negative film holder plate is mounted on said negative film carrier supporting base, said negative film size senser switch being selectively operated in response to the shape of said signal part to issue an inherent signal corresponding to the size of the negative film set in said negative film carrier unit when said negative film carrier unit is fixed on said negative film carrier supporting base by said connecting means.

2. A negative film carrier device according to claim 1 wherein said connecting means consists of at least one magnet set in said negative film carrier supporting base and an armature plate set in said negative film holder plate and capable of being attracted by said magnet.

3. A negative film carrier device according to claim 1 or 2 wherein said signal part consists of at least one pin erected on said negative film holder plate.

* * * * *